United States Patent [19]

Akers

[11] 4,248,777
[45] Feb. 3, 1981

[54] PROCESS FOR PREPARING ACID RED 151
[75] Inventor: Nancy E. Akers, Lock Haven, Pa.
[73] Assignee: American Color & Chemical Corp., Charlotte, N.C.
[21] Appl. No.: 4,445
[22] Filed: Jan. 18, 1979
[51] Int. Cl.$^3$ .................. C09B 29/10; D06P 1/06; D06P 3/16; D06P 3/24
[52] U.S. Cl. ............................. 260/191; 260/144; 260/208
[58] Field of Search .................. 260/191, 208; 8/82, 8/41 B, 41 R

[56] References Cited

U.S. PATENT DOCUMENTS

| | | | |
|---|---|---|---|
| 224,928 | 2/1880 | Kohler | 260/191 |
| 256,375 | 4/1882 | Rumpff | 260/191 |
| 2,803,625 | 8/1957 | Putter | 260/191 X |
| 3,957,425 | 5/1976 | Tullio | 8/41 B |

OTHER PUBLICATIONS

Houben–Weyl, "Methoden der Organischen Chemie," vol. X/3, pp. 22 and 23, (1965).
The Merck Index, Eighth Edition, p. 964, (1968).

*Primary Examiner*—Floyd D. Higel
*Attorney, Agent, or Firm*—Armstrong, Nikaido, Marmelstein & Kubovcik

[57] ABSTRACT

A process for preparing a non-gelling Acid Red 151 is provided. In the diazotization of aminoazobenzene monosulfonic acid in an aqueous mineral acid and the coupling of the diazotized amine with 2-naphthol in an aqueous alkaline solution, the mineral acid and alkali are chosen such that, in addition to forming the salt of the sulfonic acid group of the dye, disodium hydrogen phosphate salts are formed and left in solution in the final coupling mass.

2 Claims, No Drawings

PROCESS FOR PREPARING ACID RED 151

BACKGROUND OF THE INVENTION

1. Field of the Invention

This invention relates to an improved process for preparing the dye known as Acid Red 151 (Color Index No. 26,900) and to a non-gelling Acid Red 151.

2. Description of the Prior Art

Acid Red 151 is employed extensively in the dyeing of wool and synthetic fibers, especially nylon. The dye is commercially important because of its bright clear shade and good fastness properties.

Acid Red 151 is conventionally prepared by diazotizing aminoazobenzene monosulfonic acid in aqueous hydrochloric acid and reacting the diazotized amine with 2-naphthol in an aqueous sodium hydroxide solution. The dye prepared in this manner, however, when put in solution does not have good solubility and stability in high concentrations and exhibits gelling and specking properties.

The prior art relating to Acid Red 151 is directed primarily to methods for forming stable, concentrated solutions of the dye following synthesis of the dye according to conventional methods. Thus, for example, U.S. Pat. No. 3,957,425, teaches an improved aqueous organic solution of the salt of the disazo dye p-(p-(2-hydroxy-1-naphthylazo)phenylazo)benzenesulfonic acid.

It is an object of the present invention, therefore, to provide a method for the synthesis of Acid Red 151 that gives a dye which, when put in solution, has good solubility and forms non-gelling solutions that are stable over extended periods of time and when subjected to varying temperatures.

This and other objects will be apparent from the following description of the invention.

SUMMARY OF THE INVENTION

According to the present invention, a non-gelling Acid Red 151 is prepared according to a method which follows the usual procedure of diazotization of the base in an aqueous mineral acid and coupling of the diazotized base in a cold aqueous alkaline solution of the coupler but in which:

(1) diazotization of the base is in phosphoric acid or solution of the coupler is in aqueous sodium phosphate and (2) an ion balance is maintained in the reaction system such that, in addition to forming the sodium salt of the sulfonic acid group of the dye, disodium hydrogen phosphate, $Na_2HPO_4$, is formed in situ in the coupling mass.

The dye obtained according to the method of the present invention following isolation from the coupling mass by conventional procedures is a composition composed primarily of a compound of the formula:

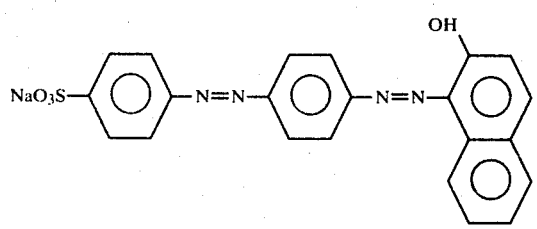

and minor amounts of the phosphate salts and other by-products of the coupling reaction. The dye has improved solubility as compared to commercially available Acid Red 151 dyes and forms stable, non-gelling solutions either hot or upon cooling.

DESCRIPTION OF PREFERRED EMBODIMENTS

The term "non-gelling" as employed herein refers to the property of a dye which allows the formation of 2% solutions in water which maintain a low viscosity after standing for 24 hours. Thus, a 2% solution of the Acid Red 151 obtained according to the method of the present invention has an initial viscosity of 60 cps as measured with a Brookfield viscosimeter and has substantially the same viscosity after standing for 24 hours. Other commercially available Acid Red 151 dyes, on the other hand, give readings of:

| Initial (cps) | 24 Hours (cps) |
|---|---|
| 300 | 960 |
| 740 | 820 |
| 100 | 1740 |

It is to be noted that dye concentrations herein refer to the percentage of standardized dye in solution. The standardized dyes will typically contain 45 to 60% of the crude color.

The method according to the present invention for preparing Acid Red 151 employs the conventional steps of diazotization of the sodium salt of aminoazobenzene monosulfonic acid and coupling of the diazotized amine into 2-naphthol at an alkaline pH. It has been found, however, that a non-gelling form of the dye is obtained if particular phosphate salts are formed in situ during the coupling reaction. Specifically, an Acid Red 151 which does not exhibit the gelling properties when put in solution of the dye prepared according to the conventional procedures is obtained if diazotization and coupling conditions are controlled so that disodium hydrogen phosphate salts are formed in situ and are left in solution in the final coupling mass.

More particularly, a non-gelling Acid Red 151 is obtained if (1) the base, the sodium salt of aminoazobenzene monosulfonic acid, is diazotized in aqueous phosphoric acid and coupled into the coupler, 2-naphthol, by adding the diazonium salt to a cold aqueous sodium hydroxide solution of the coupler and (2) an ion balance is maintained which ensures that, in addition to forming the sodium salt of the sulfonic acid group of the dye, disodium hydrogen phosphate salts are formed in situ and are left in solution in the fianl coupling mass.

Alternatively, the non-gelling Acid Red 151 may be prepared by diazotizing the base in a conventional manner in hydrochloric acid and then coupling the diazonium salt into the coupler in an aqueous sodium phosphate solution ($Na_3PO_4$) and maintaining the ion balance as defined above.

In the diazotization of the base, the mineral acid is employed in excess in the usual manner. The amount of the aqueous alkali is determined according to an ion balance between the total sodium ions present in the system, including those present in the sodium salt of the aminoazobenzene monosulfonic acid and the sodium nitrite, and the phosphate ions present in the system. Best results have been obtained by employing a precise amount of sodium hydroxide or sodium phosphate as determined according to calculations.

Diazotization of the base is carried out in a usual manner at a temperature of about 0°–5° C. and the diazonium salt is added to the aqueous alkaline solution of the coupler while maintaining a temperature of less than about 15° C.

The dye is isolated from the coupling mass by filtration. The filter cake is washed with water and is then oven dried.

The invention may be better understood by referring to the following example.

EXAMPLE I

Step I: Diazotization of the sodium salt of aminoazobenzene monosulfonic acid (AABMSA)

There were charged to a 600 ml beaker with magnetic stirring:
200 g of water
20.3 g of AABMSA (Na Salt, 0.07 mole) and
16.7 g of phosphoric acid (85%, Fisher; 0.145 mole, 100%). The mixture was stirred to a fine, orange slurry and then cooled to 3° C. in an ice bath. To this cold slurry was added:
5.0 g of sodium nitrite (0.07 mole + 1% excess) predissolved in 40 ml of water. The slurry was then stirred at −10° C. for five and one-half hours. The diazo was a tan slurry having a volume of about 300 ml a pH of 3,7 and a temperature of about 9° C.

Step II: Preparation of Coupler

There were charged to a two liter beaker with overhead stirring:
200 g of water
10.1 g of 2-naphthol (0.07 mole) and
17.6 g of 50% caustic (0.22 mole, 100%).
This mixture was stirred to a clear grey solution and then cooled to 4° C. in an ice bath. The solution had a pH of 13.5.

Step III: Coupling

The diazo from Step I was poured in one portion into the coupler from Step II.

The resulting thick red mass was stirred overnight without temperature control.

The reaction slurry was filtered and the cake was washed with ice water until the bright yellow run-out ran red. the cake was then oven-dried. Yield=26 g, 78%.

What is claimed is:

1. In a process for preparing the dye:

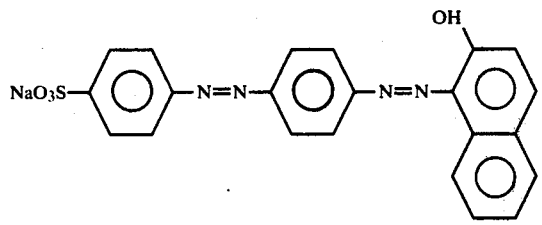

wherein the sodium salt of aminoazobenzene monosulfonic acid is diazotized with sodium nitrite in an aqueous mineral acid and the resultant diazonium salt added to a cold aqueous alkaline solution of 2-naphthol to effect coupling, the improvement comprising: (1) employing (a) phosphoric acid as the mineral acid in the diazotization and sodium hydroxide as the aqueous alkali in the coupling or (b) hydrochloric acid as the mineral acid in the diazotization and sodium phosphate as the aqueous alkali in the coupling and (2) maintaining an ion balance in the reaction system such that disodium hydrogen phosphate salts are formed in situ and remain in solution in the final coupling mass.

2. The dye prepared according to the process of claim 1.

* * * * *